United States Patent
Starner et al.

(10) Patent No.: US 9,268,136 B1
(45) Date of Patent: Feb. 23, 2016

(54) USE OF COMPARATIVE SENSOR DATA TO DETERMINE ORIENTATION OF HEAD RELATIVE TO BODY

(71) Applicant: Google Inc., Mountain View, CA (US)

(72) Inventors: Thad Eugene Starner, Mountain View, CA (US); Michael Patrick Johnson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/631,454

(22) Filed: Sep. 28, 2012

(51) Int. Cl.
 *G09G 5/00* (2006.01)
 *G02B 27/01* (2006.01)
 *G06F 3/01* (2006.01)

(52) U.S. Cl.
 CPC ...... *G02B 27/017* (2013.01); *G02B 2027/0178* (2013.01); *G06F 3/011* (2013.01)

(58) Field of Classification Search
 CPC .. G02B 27/0101; G02B 27/01; G02B 27/017; G02B 2027/0118; G02B 2027/0187; G02B 27/0172; G02B 2027/0132; G02B 27/0176; G09G 3/003; H04N 13/0497; H04N 13/0285; H04N 13/044; H04N 13/0059
 USPC .................................................. 345/156, 7–9
 See application file for complete search history.

(56) References Cited

U.S. PATENT DOCUMENTS

| | | | | |
|---|---|---|---|---|
| 5,526,022 A * | 6/1996 | Donahue | .................. | G01C 9/20 324/253 |
| 5,850,201 A * | 12/1998 | Lasko-Harvill | ......... | G06F 3/011 340/4.1 |
| 6,124,838 A * | 9/2000 | Lasko-Harvill | ......... | G06F 3/011 340/4.13 |
| 6,127,990 A | 10/2000 | Zwern | | |
| 6,369,952 B1 | 4/2002 | Rallison et al. | | |
| 6,452,574 B1 * | 9/2002 | Lasko-Harvill | ......... | G06F 3/011 340/4.1 |
| 6,563,489 B1 * | 5/2003 | Latypov | .................. | G06F 3/011 345/156 |
| 7,301,648 B2 | 11/2007 | Foxlin | | |
| 7,542,040 B2 * | 6/2009 | Templeman | ............ | G06F 3/011 345/474 |
| RE42,336 E | 5/2011 | Fateh et al. | | |
| 2006/0284792 A1 * | 12/2006 | Foxlin | .................. | G02B 27/017 345/8 |
| 2009/0096714 A1 * | 4/2009 | Yamada | ............................ | 345/8 |
| 2009/0189974 A1 * | 7/2009 | Deering | .......................... | 348/46 |
| 2009/0195497 A1 * | 8/2009 | Fitzgerald et al. | ............ | 345/156 |
| 2011/0009241 A1 * | 1/2011 | Lane | .................. | G06K 9/00342 482/8 |
| 2011/0187640 A1 | 8/2011 | Jacobsen et al. | | |
| 2011/0234631 A1 * | 9/2011 | Kim | ........................ | G06T 15/60 345/632 |
| 2011/0241976 A1 * | 10/2011 | Boger | ................ | G02B 27/0172 345/8 |
| 2011/0249122 A1 * | 10/2011 | Tricoukes et al. | ............ | 348/158 |
| 2012/0050144 A1 | 3/2012 | Morlock | | |
| 2012/0188148 A1 * | 7/2012 | DeJong | ............................ | 345/8 |
| 2012/0236025 A1 * | 9/2012 | Jacobsen | ................. | G06F 3/011 345/629 |
| 2012/0287284 A1 * | 11/2012 | Jacobsen | ................. | G06F 1/163 348/158 |
| 2013/0083009 A1 * | 4/2013 | Geisner | ................... | A63F 13/02 345/419 |
| 2013/0106674 A1 * | 5/2013 | Wheeler | .............. | G02B 27/017 345/8 |
| 2013/0106684 A1 * | 5/2013 | Weast | ................. | G06F 19/3481 345/156 |
| 2013/0286046 A1 * | 10/2013 | Rodriguez | ............. | G06F 3/011 345/633 |
| 2013/0300649 A1 * | 11/2013 | Parkinson | ............ | G02B 27/017 345/156 |

* cited by examiner

*Primary Examiner* — Temesgh Ghebretinsae
*Assistant Examiner* — Michael J Jansen, II
(74) *Attorney, Agent, or Firm* — McDonnell Boehnen Hulbert & Berghoff LLP

(57) ABSTRACT

Methods and systems are described that involve a head-mountable display (HMD) or an associated device determining the orientation of a person's head relative to their body. To do so, example methods and systems may compare sensor data from the HMD to corresponding sensor data from a tracking device that is expected to move in a manner that follows the wearer's body, such a mobile phone that is located in the HMD wearer's pocket.

26 Claims, 8 Drawing Sheets

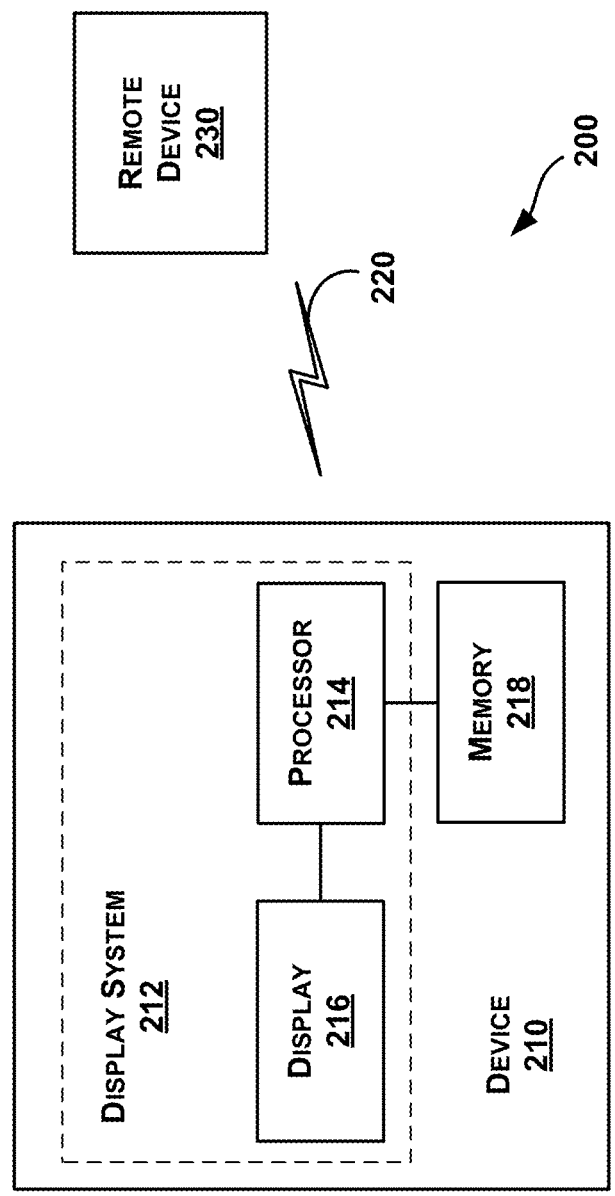

USE OF COMPARATIVE SENSOR DATA TO DETERMINE ORIENTATION OF HEAD RELATIVE TO BODY

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method may involve a computing device: (i) detecting sensor data that is indicative of an association between movement of a tracking device and body movement; (ii) in response to detecting the sensor data that is indicative of the positional association: (a) determining a forward-backward body axis of a body and (b) determining a base orientation of a tracking device relative to the forward-backward body axis; (iii) determining a first orientation of a head-mountable device (HMD) relative to the tracking device; and (iv) determining a first head orientation relative to the body based on both: (a) the first orientation of the HMD relative to the tracking device and (b) the base orientation of the tracking device relative to the forward-backward body axis.

In another aspect, a non-transitory computer readable medium may have stored therein instructions that are executable to cause a computing system to perform functions comprising: (i) detecting sensor data that is indicative of an association between movement of a tracking device and body movement; (ii) in response to detecting the sensor data that is indicative of the positional association: (a) determining a forward-backward body axis of a body and (b) determining a base orientation of a tracking device relative to the forward-backward body axis; (iii) determining a first orientation of a head-mountable device (HMD) relative to the tracking device; and (iv) determining a first head orientation relative to the body based on both: (a) the first orientation of the HMD relative to the tracking device and (b) the base orientation of the tracking device relative to the forward-backward body axis.

In a further aspect, a computing system may include a non-transitory computer readable medium and program instructions stored on the non-transitory computer readable medium. The program instructions may be executable by at least one processor to: (i) detect sensor data that is indicative of an association between movement of a tracking device and body movement; (ii) in response to detecting the sensor data that is indicative of the positional association: (a) determine a forward-backward body axis of a body and (b) determine a base orientation of a tracking device relative to the forward-backward body axis; (iii) determine a first orientation of a head-mountable device (HMD) relative to the tracking device; and (iv) determine a first head orientation relative to the body based on both: (a) the first orientation of the HMD relative to the tracking device and (b) the base orientation of the tracking device relative to the forward-backward body axis.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2 is a simplified illustration of a network via which one or more devices may engage in communications, according to an exemplary embodiment.

DETAILED DESCRIPTION

Figure 1A:
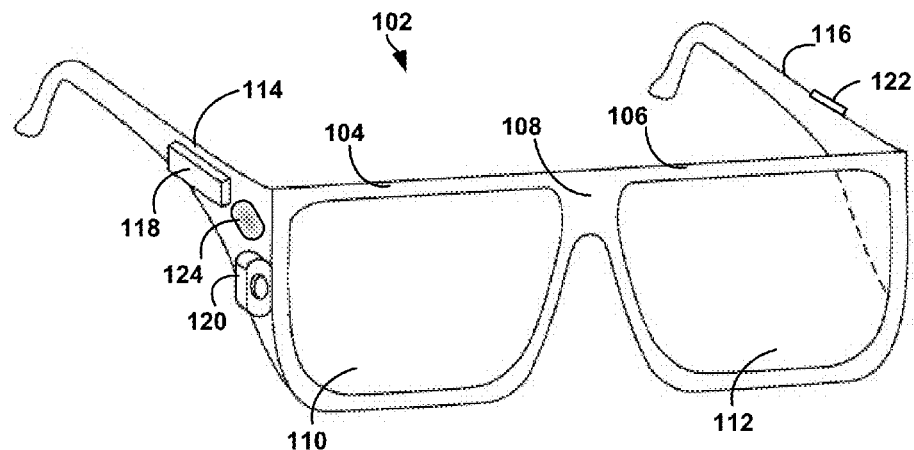
FIG. 1A illustrates a wearable computing system according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

There are scenarios where it may be useful for a head-mountable display (HMD), such as a glasses-style wearable computer, to know how a wearer's head is oriented with respect to their body. For example, the position of the head relative to the body may be used to provide augmented-reality style graphics in the HMD, in which certain applications or graphics may then be rendered at the same place relative to the body. As a specific example, a wearer might look over their left shoulder to view an e-mail application, and look over their right shoulder to view a web browser. As such, the e-mail application and web browser may appear to exist in space over the user's left and right shoulder, respectively.

An example embodiment may utilize data from an HMD and a tracking device located on the body of the HMD wearer to determine the orientation of the head relative to the wearer's body. The tracking device may take various forms, such as computing device the wearer typically has on their person (e.g., a mobile phone) or a separate dedicated tracking device that the user can put in their pocket or attach to their clothing. Importantly, example embodiments may help an HMD to determine head position relative to a wearer's body, without requiring that the user mount the tracking device at a certain location and in a certain position on the body.

In an exemplary embodiment, an HMD (or a remote computing system in communication with an HMD) may compare the HMD's sensor data to the sensor data from a tracking device that is expected or inferred to have a certain physical association to the wearer's body. For example, the HMD may determine that the wearer has a mobile phone in their pocket (or in another location where the movement of the phone is generally expected to follow the movement of the wearer's body). The HMD may then detect when the wearer is walking and determine the forward direction by sensing which direction the body is moving while walking. The HMD or mobile phone can then use sensor data from the mobile phone to determine the orientation of the phone with respect to the body (e.g., the orientation with respect to an axis aligned with direction the wearer is walking) In addition, the HMD may use magnetometer data (and possibly gyroscope data) from both the HMD and the mobile phone to determine each device's orientation relative to magnetic north. The HMD can then use this information to determine the orientation of the HMD with respect to the tracking device. Then, to determine the orientation of the HMD with respect to the body, the HMD may offset its orientation with respect to the tracking device by the orientation of the tracking device with respect to the body.

The above technique, which can provide the horizontal rotation of the head relative to the body, relies on the difference between magnetometer readings at the HMD and a tracking device such as a mobile phone. In a further aspect, the differences between the accelerometer and/or gyroscope readings of the tracking device and the HMD can be used in a similar manner to determine the pitch and/or yaw of the head relative to the body. Therefore, by analyzing the differences in sensor data between the accelerometers, magnetometers, and/or gyroscopes of an HMD and a tracking device, the HMD may detect three-dimensional changes in head position relative to the body.

II. Illustrative Systems

Systems and devices in which exemplary embodiments may be implemented will now be described in greater detail.

In general, an exemplary system may be implemented in or may take the form of a wearable computer. In particular, an exemplary system may be implemented in association with or take the form of a head-mountable display (HMD), or a computing system that receives data from an HMD, such as a cloud-based server system.

However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary system may also take the form of a device such as a wearable computer or mobile phone, or a subsystem of such a device, which includes such a non-transitory computer readable medium having such program instructions stored thereon.

FIG. 1A illustrates a wearable computing system according to an exemplary embodiment. In FIG. 1A, the wearable computing system takes the form of a head-mounted device (HMD) 102 (which may also be referred to as a head-mountable display). It should be understood, however, that exemplary systems and devices may take the form of or be implemented within or in association with other types of devices, without departing from the scope of the invention. As illustrated in FIG. 1A, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the HMD 102 may connect to or be affixed within a head-mounted helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
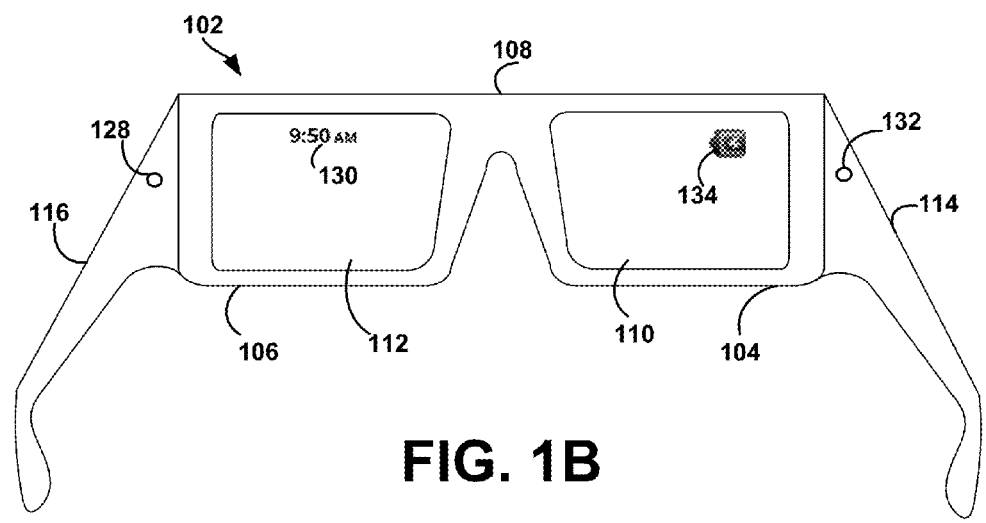
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
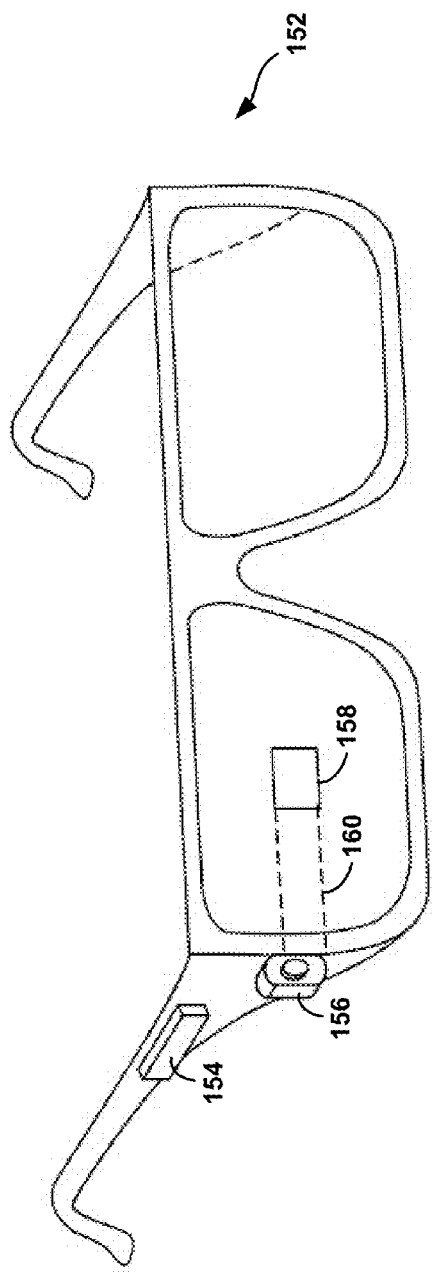
FIG. 1C illustrates another wearable computing system according to an exemplary embodiment.

FIG. 1C illustrates another wearable computing system according to an exemplary embodiment, which takes the form of an HMD 152. The HMD 152 may include frame elements and side-arms such as those described with respect to FIGS. 1A and 1B. The HMD 152 may additionally include an on-board computing system 154 and a video camera 206, such as those described with respect to FIGS. 1A and 1B. The video camera 206 is shown mounted on a frame of the HMD 152. However, the video camera 206 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
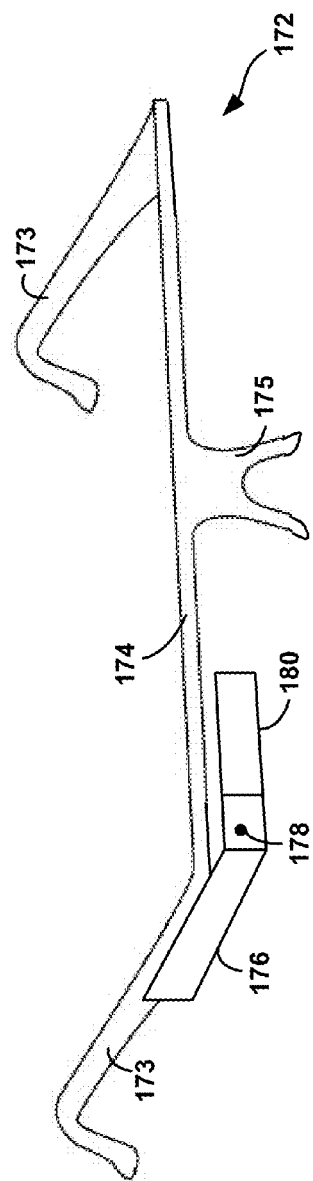
FIG. 1D illustrates another wearable computing system according to an exemplary embodiment.

FIG. 1D illustrates another wearable computing system according to an exemplary embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

FIG. 2 illustrates a schematic drawing of a computing device according to an exemplary embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In an illustrative embodiment, a remote device 230 such as a mobile phone, tablet computing device, a laptop computer, etc., could be utilized as a tracking device. More specifically, device 210 may be an HMD, and sensor data from sensors on the remote device 230, such data from one or more magnetometers, accelerometers, and/or gyroscopes, may be compared to corresponding sensor data from the HMD to determine the position of the HMD wearer's head relative to their body.

The remote device 230 could also be a remote computing system that is configured to perform functions on behalf of device 210; i.e., a "cloud" computing system. In such an embodiment, the remote computing system may receive data from device 210 via link 220, perform certain processing functions on behalf of device 210, and then send the resulting data back to device 210.

Further, device 210 may be in communication with a number of remote devices, such as remote device 230. For example, an HMD could be in communication with a remote computing system that provides certain functionality to the HMD, as well as a mobile phone, or another such device that may serve as a tracking device in embodiments described herein. Other examples are also possible.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Illustrative Methods

Figure 3:
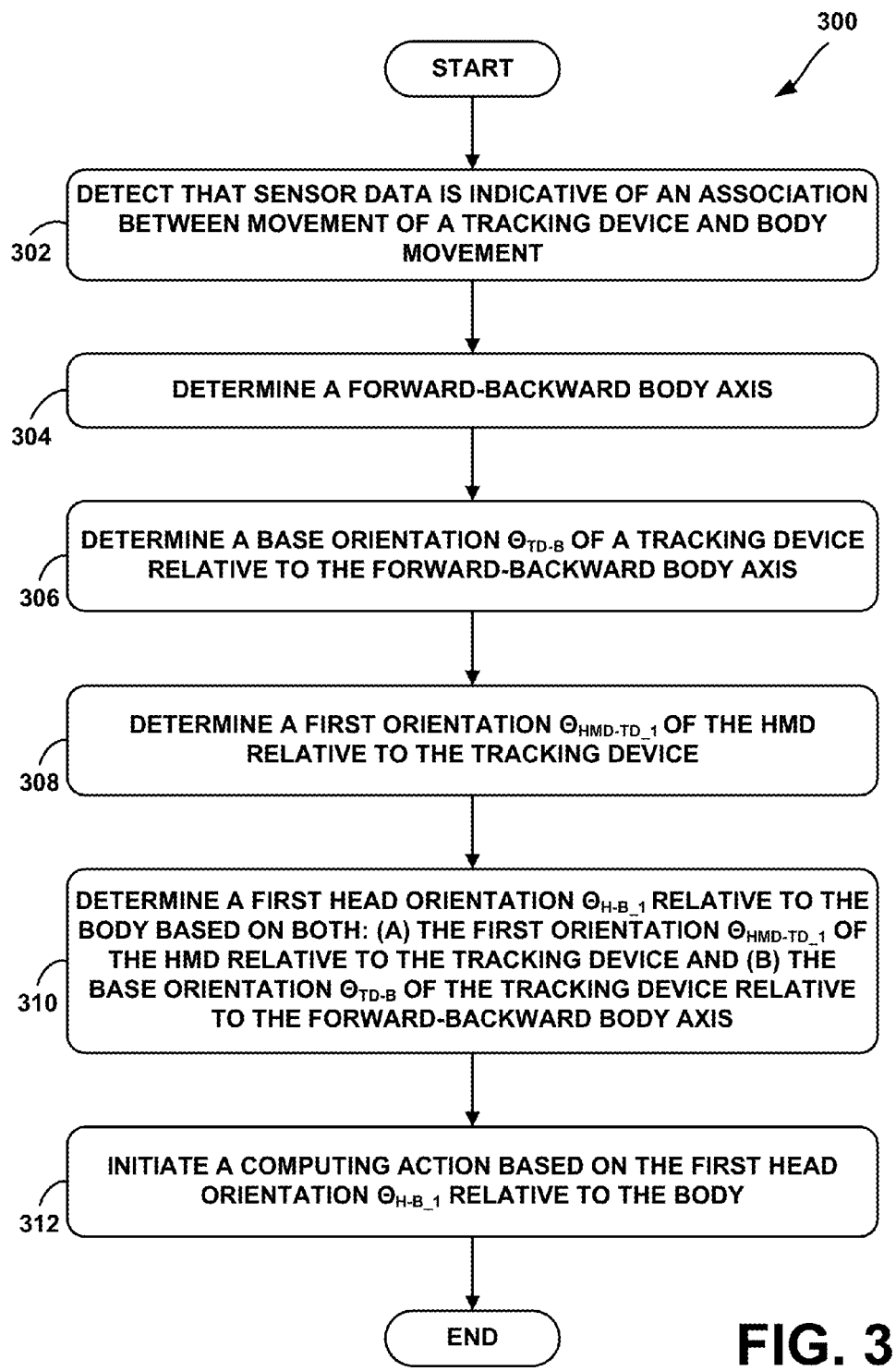
FIG. 3 is a flow chart illustrating a method, according to an example embodiment.

FIG. 3 is a flow chart illustrating a method 300, according to an example embodiment. Illustrative methods, such as method 300, may be carried out in whole or in part by an HMD, such as the head-mountable displays shown in FIGS. 1A to 1D. Example methods, or portions thereof, could also be carried out by a tracking device (e.g., a mobile phone or another mobile device that the wearer of an HMD might carry on their person), alone or in combination with an HMD. Further, an example method, or portions thereof, may be carried out by computing device that is in communication with an HMD and/or in communication with a tracking device. An example method may also be carried out by other types of computing devices and/or combinations of computing devices, without departing from the scope of the invention.

As shown by block 302, method 300 involves a computing device detecting that sensor data is indicative of an association between movement of a tracking device and body movement. For example, an HMD may detect that data from an accelerometer and/or gyroscope of the HMD (and/or data from such sensors on the tracking device) corresponds to the HMD wearer walking forward.

In response to detecting the sensor data that is indicative of such an association, the computing device may perform a calibration routine to determine an orientation of the tracking device with respect to the HMD wearer's body. (This assumes that the HMD is being worn; if it is not, then the calibration routine may still be implemented, but will produce an orientation of the tracking device with respect to a hypothetical position of the body.) More specifically, the computing device may determine a forward-backward body axis of a body, as shown by block 304. Further, the computing device may determine a base orientation of a tracking device relative to the forward-backward body axis, which may be referred to as $\theta_{TD-B}$, as shown by block 306.

Once the computing device has performed the calibration routine, the computing device may use the base orientation $\theta_{TD-B}$ of the tracking device relative to the forward-backward body axis in order to determine an orientation of the head relative to the body. For instance, in the illustrated method 300, the computing device may determine a first orientation $\theta_{HMD-TD\_1}$ of the HMD relative to the tracking device, as shown by block 308. The computing device may then determine a first head orientation $\theta_{H-B\_1}$ relative to the body (e.g., forward-backward body axis) based on both: (a) the first orientation $\theta_{HMD-TD\_1}$ of the HMD relative to the tracking device and (b) the base orientation $\theta_{TD-B}$ of the tracking device relative to the forward-backward body axis, as shown by block 310. In a further aspect, the computing device may initiate a computing action based on the first head orientation $\theta_{H-B\_1}$ relative to the body, as shown by block 312.

Figure 4A:
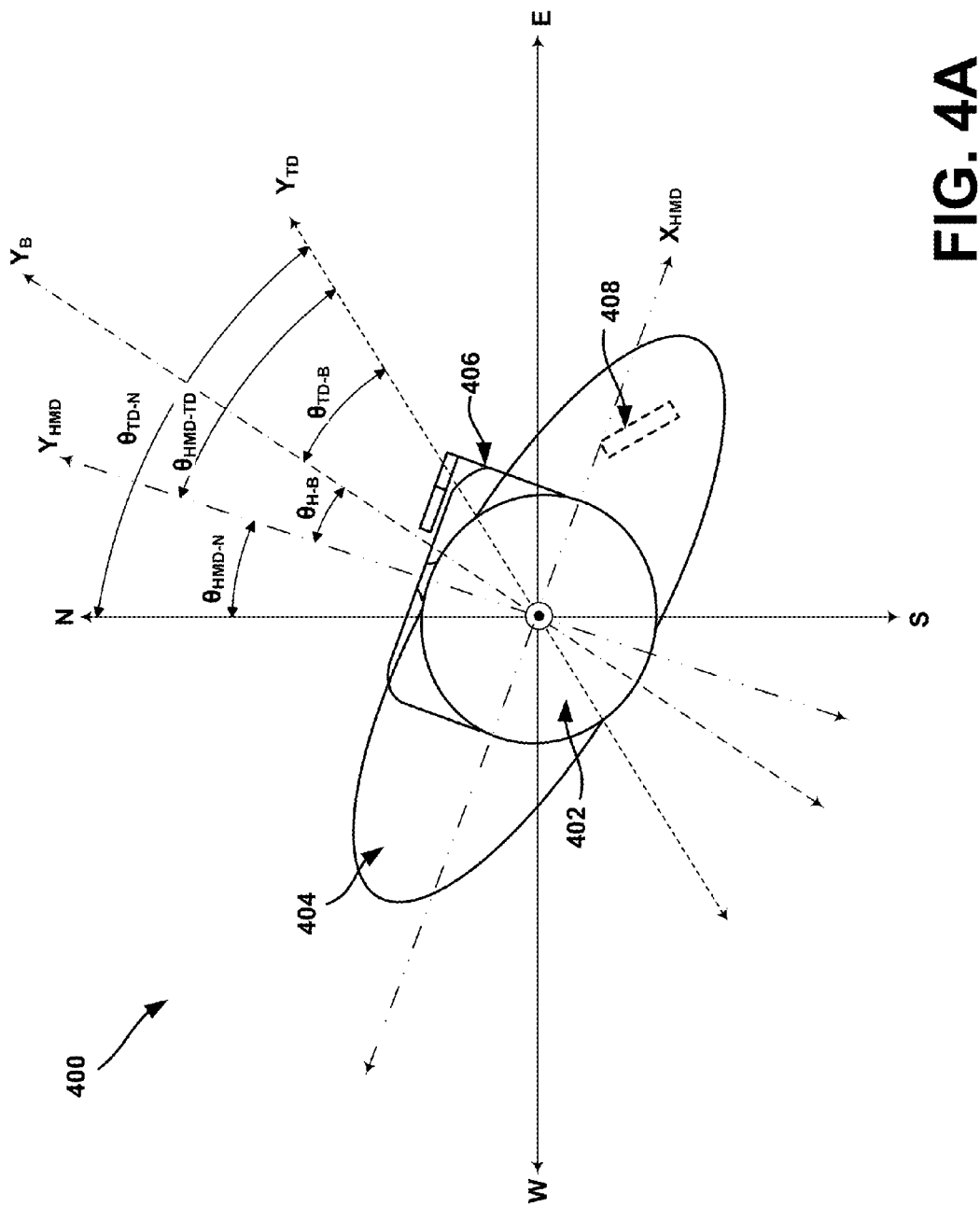
FIG. 4A is a top-down illustration of a scenario in which an HMD wearer has a tracking device on their person.

Method 300 may be described herein with reference to the scenario illustrated in FIG. 4A. In particular, FIG. 4A is a top-down illustration of a scenario 400 in which an HMD wearer has a tracking device on their person. More specifically, FIG. 4A shows a top down view of the head 402 and the body 404 of a person that is wearing an HMD 406 and has a mobile phone 408 on their person. FIG. 4A also shows the north-south (N-S) and east-west (E-W) axes that are defined by magnetic north (N).

A. Detecting an Association Between Movement of a Tracking Device and Body Movement Referring to FIG. 3, at block 302, a computing device may use various techniques to detect an association between the movement of a tracking device and body movement. Further, to do so, various types of sensor data may be utilized.

For example, an HMD or a mobile phone may receive data that is indicative of movement of the HMD and/or data that is indicative of movement of the tracking device, such as data from a gyroscope, accelerometer, and/or a compass on one or both of the devices. The computing device may then analyze such sensor data and determine that it is characteristic of movement along the forward-backward body axis.

For instance, when the wearer of an HMD is walking or driving, and has a mobile phone in their pocket (which serves as the tracking device), the accelerometer(s) and/or gyroscopes of the mobile phone and/or of the HMD may indicate movement of the mobile phone and/or movement of the HMD that is characteristic of walking. Similarly, there may be movement patterns that are indicative of the wearer driving or riding in a car. More generally, the computing device may detect the association when it detects other an action where the wearer's body is typically facing in the direction they are moving, such that the movement of the wearer's body has significant directional component in the forward or backward direction (e.g., along the forward-backward body axis $Y_B$ of the wearer's body, as shown in FIG. 4A).

Techniques for analyzing sensor data, such as data from accelerometers, gyroscopes, and/or compasses, to detect actions where the wearer's body is typically aligned with the forward-backward body axis $Y_B$ of the wearer's body, such as walking, driving or riding in a car, are known in the art. Accordingly, the details of such techniques or not discussed further herein.

When the wearer is engaged in an action such as walking or driving, it may often be the case that the wearer has a tracking device such as a mobile phone on their person (e.g., in their pocket, purse, backpack, etc.) or nearby in an orientation that is relatively stable with respect to their body (e.g., sitting on the passenger seat of their car while the HMD wearer is driving). In such a scenario, the position of the tracking device may therefore provide an indication of the position of the wearer's body. For example, when an HMD wearer has a mobile phone or another type of tracking device in their pocket, movements of the mobile phone will typically follow the movements of the wearer's body.

Accordingly, an HMD may use its orientation with respect to the mobile phone to determine the HMD's orientation with respect to the wearer's body. And since the HMD may generally be assumed to align with the wearer's head (possibly after adjusting to account for translation between the wearer's field of view and sensors on the HMD), the HMD may use the HMD's orientation with respect to the wearer's body as a measure of the orientation of the wearer's head with respect to the wearer's body.

B. Calibration i. Determining the Forward-Backward Body Axis

At block 304, computing device may use various techniques to define the forward-backward axis $Y_B$. In particular, and as noted above, a wearer's movement that typically has a significant forward or backward component along the forward-backward body axis $Y_B$, such as walking, may be interpreted to indicate the association between movement of a tracking device and movement of the body. Therefore, when a computing device detects sensor data that is indicative of such a movement by the wearer, some or all of this data may be analyzed to determine the direction of forward body movement, which may then be used to define the forward-backward body axis $Y_B$.

Figure 4B:
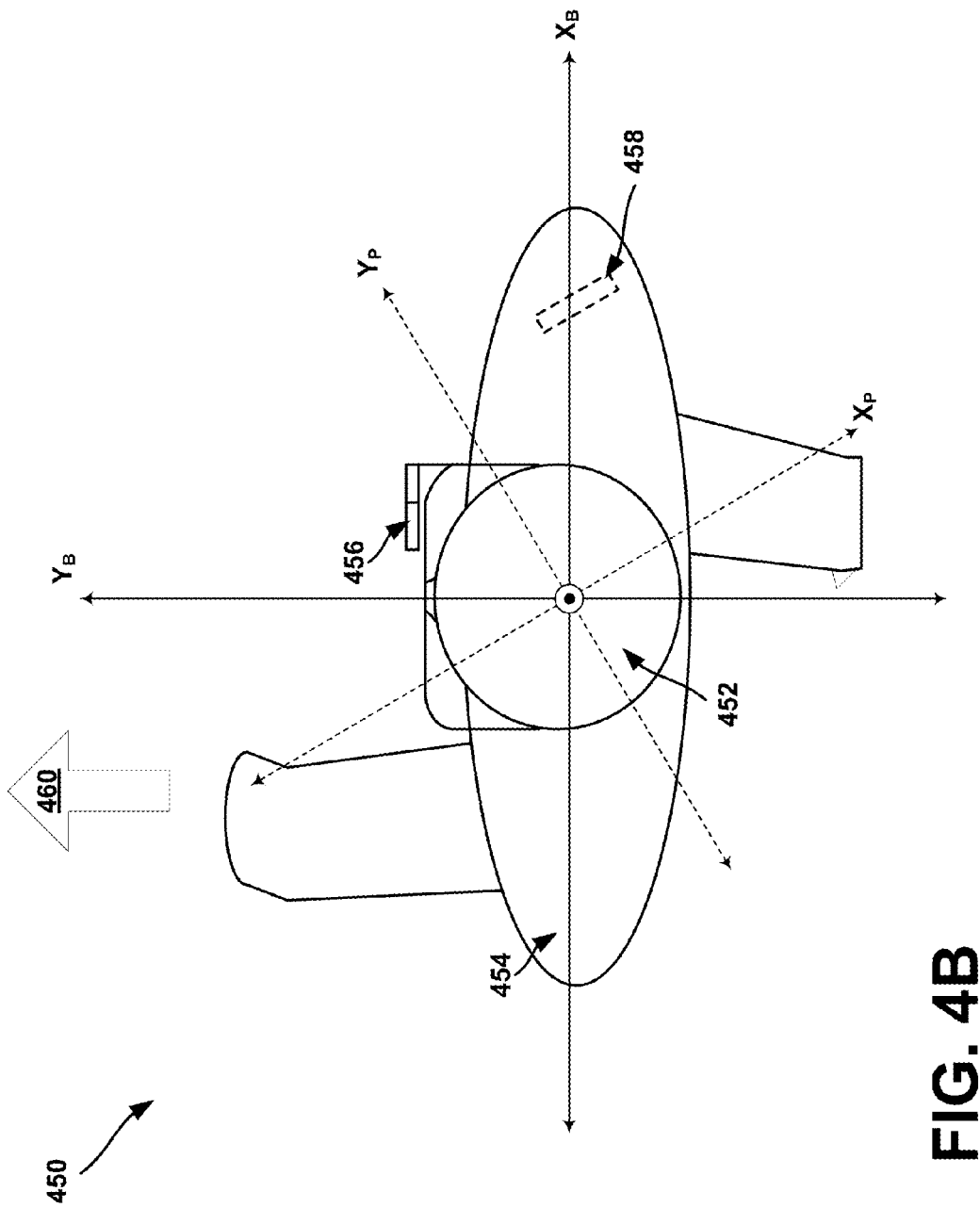
FIG. 4B is a top-down illustration of a scenario in which an HMD wearer has a tracking device on their person while walking.

As a specific example, FIG. 4B is a top-down illustration of a scenario 450 in which an HMD wearer has a tracking device on their person while walking More specifically, FIG. 4B shows a top-down view of the head 452 and the body 454 of a person that is wearing an HMD 456 and has a mobile phone 458 on their person (e.g., in their pocket). As is often the case, the person's head 452 and body 454 are facing forward, in the direction 460 that the person is walking.

To determine the forward-backward body axis $Y_B$, a computing device such as the mobile phone 458 and/or HMD 456 may first determine an up-down body axis. To do so, the mobile phone 458 and/or HMD 456 may determine the direction of gravitational force, which is aligned with the up-down body axis (assuming the wearer is in an upright position). In particular, the mobile phone 458 and/or HMD 456 may utilize data from the HMD's accelerometer(s) and/or gyroscopes(s), and/or data from the tracking device's accelerometer(s) and/or gyroscopes(s). Then, to determine the forward-backward axis $Y_B$, the computing device may then evaluate accelerometer readings that are perpendicular to the downward direction (i.e., perpendicular to the direction of gravitational force).

More specifically, when the movement that indicates the association between the mobile phone 458 and the wearer's body 454, the accelerometer data from the mobile phone 458 and/or from the HMD 456 may be expected to have the highest variance in the forward direction. As such, the HMD 456 and/or the mobile phone 458 may analyze the accelerometer data to determine the forward direction of the body by determining the direction having the highest variance, or possibly the direction having the highest average magnitude, over a predetermined period of time (e.g., a two-second window). The computing device may then align the forward-backward body axis $Y_B$ with the direction that is determined to be forward.

ii. Determining the Offset Between the Tracking Device and Body

Once the computing device has determined the wearer's the forward-backward body axis $Y_B$, the computing device may determine the base orientation $\theta_{TD-B}$ of the tracking device relative to the forward-backward body axis. Since the association between the movement of the tracking device and body movement has been detected, it may be inferred that the tracking device will follow the wearer's body. As such, the base orientation $\theta_{TD-B}$ of the tracking device relative to the forward-backward body axis may be used as a reference to determine the orientation of the HMD (and thus the head) with respect to the wearer's body.

For instance, if the tracking device is a mobile phone that is located in the wearer's pocket, it may be expected that the tracking device is likely to stay in the wearer's pocket for at least a short period of time. The wearer's pocket may further be expected to hold the mobile phone in substantially the same place with respect to the wearer's body. Thus, the orientation $\theta_{TD-B}$ of the mobile phone 408 with respect to the wearer's body 406 may be expected and/or assumed to remain substantially the same over a certain period of time. Therefore, at a given point in time, the orientation $\theta_{TD-B}$ of the mobile phone 408 with respect to the wearer's body 406 may be used to offset the orientation of the HMD relative to the tracking device, to determine the orientation of the HMD relative to the body.

More specifically, at block 306 of method 300, the determination of the base orientation $\theta_{TD-B}$ of the tracking device relative to the forward-backward body axis may involve the computing device determining an angle between a forward direction of the tracking device and the directional component along the forward-backward body axis. To do so, a compass and/or other sensors of the tracking device may be configured so as to indicate the orientation of the tracking device relative to magnetic north. Data from the compass and/or the other sensors may therefore be used to determine the direction that the tracking device is facing.

As a specific example, in FIG. 4A, the direction that the mobile phone 408 is facing may define the tracking device's forward-backward axis $Y_{TD}$, as shown in FIG. 4. The computing device may then use the forward direction along the tracking device's forward-backward axis $Y_{TD}$ and the forward direction along the body's forward-backward $Y_B$, to determine the base orientation $\theta_{TD-B}$ of the tracking device with respect to the body.

Note that in FIG. 4A, the tracking device's forward-backward axis $Y_{TD}$ is shifted such that it aligns with the up-down axis of the wearer's body, instead of the up-down axis of the body. This is done for illustrative purposes. More specifically, in an illustrative embodiment, the orientation $\theta_{TD-B}$ of the tracking device relative to the body is measured in a parallel plane to the plane of the forward-backward body axis $Y_B$, (e.g., parallel to the yaw planes of the wearer's body and the wearer's head). Therefore, in such an embodiment, the shift of the tracking device's forward-backward axis $Y_{TD}$ does not effect on how the orientation $\theta_{TD-B}$ is calculated.

C. Determining the Orientation of the HMD Relative to the Tracking Device

Figure 5:
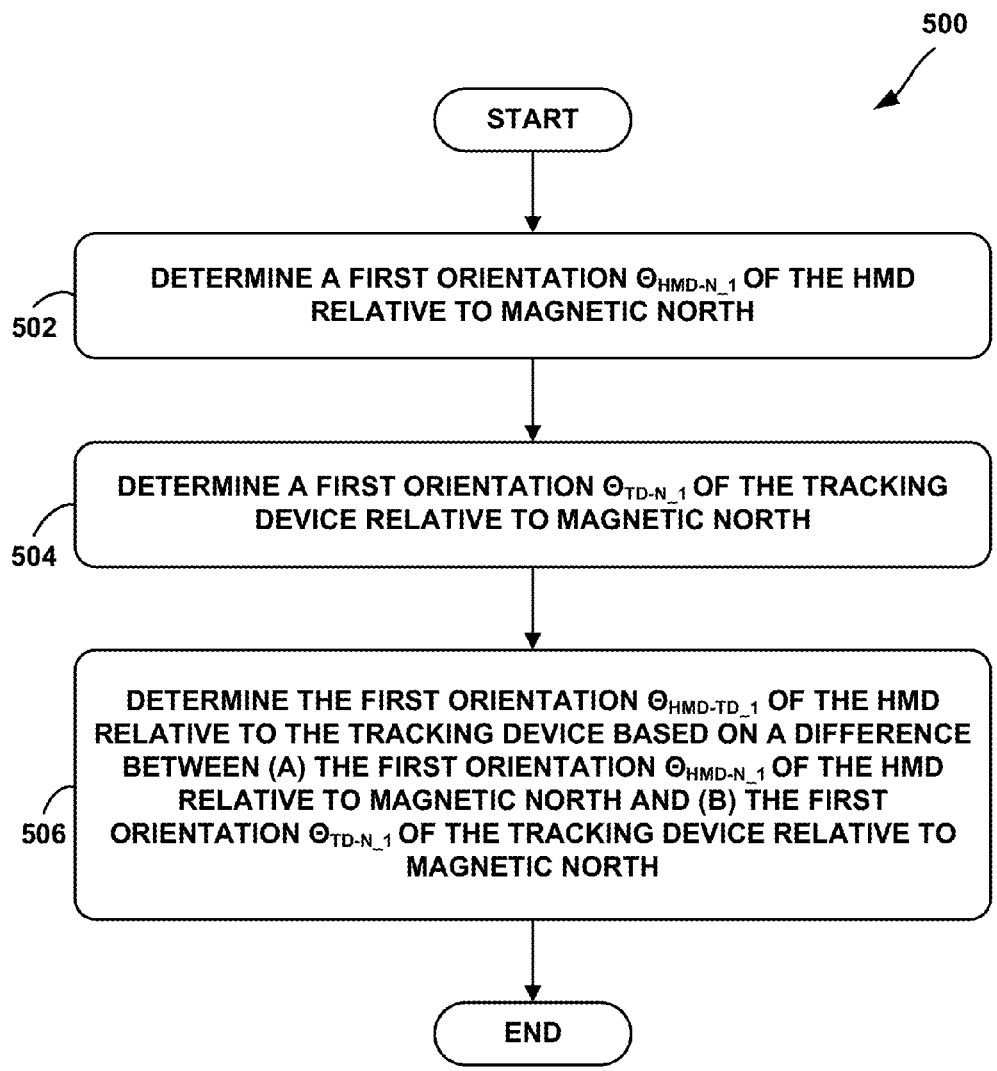
FIG. 5 is a flow chart illustrating a method for determining the orientation of an HMD relative to a tracking device.

Referring again to example method 300 of FIG. 3, various techniques may be used to determine the first orientation $\theta_{HMD-TD\_1}$ of the HMD relative to the tracking device. For example, FIG. 5 is a flow chart illustrating a method for determining the orientation of an HMD relative to a tracking device. In particular, method 500 may determine the orientation of an HMD relative to a tracking device based on: (a) magnetometer data associated with the HMD and (b) magnetometer data associated with the tracking device.

More specifically, at block 502 of method 500, a computing device may determine a first orientation $\theta_{HMD-N\_1}$ of the HMD relative to magnetic north. This determination may be based on magnetometer data associated with the HMD (e.g., data captured by the HMD's magnetometer). The computing device may also determine a first orientation $\theta_{TD-N\_1}$ of the tracking device relative to magnetic north, as shown by block 504. These determinations may be based on magnetometer data associated with the HMD (e.g., data captured by the HMD's magnetometer), and on magnetometer data associated with the tracking device (e.g., data captured by the tracking device's magnetometer), respectively. The computing device may then determine the first orientation $\theta_{HMD-TD\_1}$ of the HMD relative to the tracking device based on a difference between (a) the first orientation $\theta_{HMD-N\_1}$ of the HMD relative to magnetic north and (b) the first orientation $\theta_{TD-N\_1}$ of the tracking device relative to magnetic north, as shown by block 506.

For instance, FIG. 4A shows the orientation $\theta_{HMD-TD}$ of the HMD 406 relative to the mobile phone 408 in example scenario 400. Applying method 500 in scenario 400, block 502 may involve the HMD 406 (or a remote computing system in communication with the HMD) analyzing data from a compass (e.g., a magnetometer) and/or other sensors attached to or integrated in the HMD 406, and determining the first orientation of the HMD 406 relative to magnetic north ($\theta_{HMD-N\_1}$) therefrom. Similarly, block 504 may involve the HMD 406 and/or the mobile phone 408 analyzing data from the mobile phone's compass and/or other sensors of the mobile phone 408, and determining the first orientation of the mobile phone 408 relative to magnetic north ($\theta_{TD-N\_1}$) therefrom. The HMD 406 may then calculate its orientation relative to the mobile phone 408 ($\theta_{HMD-TD\_1}$) as being equal to the angular difference between $\theta_{HMD-N\_1}$ and $\theta_{TD-N\_1}$.

D. Determining the First Head Orientation Relative to the Body

At block 310 of method 300, various techniques may be used to determine the head orientation relative to the wearer's body.

In particular, by determining the base orientation of a tracking device relative to the forward-backward body axis ($\theta_{TD-B}$) at block 306, the computing device has a quantitative measure of how the HMD is positioned with respect to the tracking device. Further, by determining the orientation of the HMD relative to the tracking device $\theta_{HMD-TD}$ at block 308, the computing device has a quantitative measure of how the HMD is positioned with respect to the tracking device. As such, a computing device may determine the orientation $\theta_{HMD-TD}$ of the HMD relative to the tracking device, and then adjust according to the base orientation $\theta_{TD-B}$ to determine the orientation $\theta_{H-B}$ of the wearer's head relative to their body. As a specific example, and referring again to FIG. 4, a computing device may offset $\theta_{HMD-TD}$ to account for the orientation $\theta_{TD-B}$ of the mobile phone 408 with respect to the body 404, in order to determine the orientation $\theta_{H-B}$ of the head 402 with respect to the body 404.

Further, it may be assumed that the base orientation $\theta_{TD-B}$ of the tracking device relative to the forward-backward body axis stays substantially the same over certain periods of time (such as when the tracking device is a mobile phone in the wearer's pocket or purse). It is also possible that the computing device may explicitly determine that the tracking device has not or is unlikely to have moved relative to the body since calculating $\theta_{TD-B}$. In either case, the initially-determined base orientation $\theta_{TD-B}$ of the tracking device relative to the forward-backward body axis can thus be used to offset a subsequent calculation of $\theta_{HMD-TD}$ and determine the orientation of the head relative to the body ($\theta_{H-B}$) at the time of the subsequent calculation.

E. Determining Three-Dimensional Head Position Relative to Body in

In the above description for FIGS. 3 to 5, differences between the magnetometer readings from an HMD and a mobile phone or another tracking device are used to determine two-dimensional orientation of the HMD wearer's head with respect to the wearer's body (i.e., the yaw of the head with respect to the body). In some embodiments, additional sensor data, may be used to determine the orientation of the wearer's head relative to their body in three dimensions. For example, the differences between the accelerometer readings of the tracking device and the HMD can be used in a similar manner to determine upward and downward movements of the head relative to the body.

Figure 6:
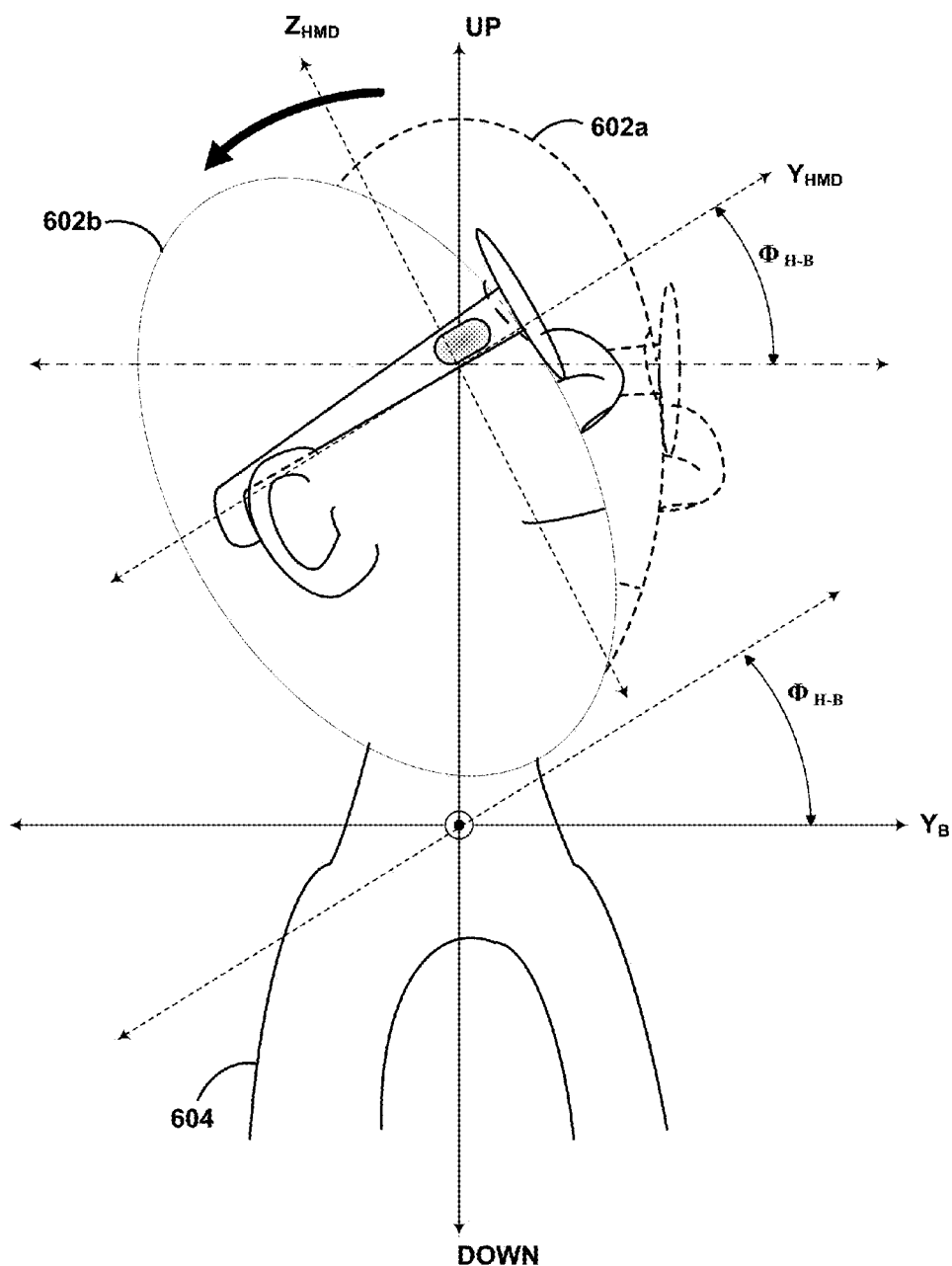
FIG. 6 illustrates a side-view of a scenario in which an HMD wearer moves their head with respect to their body.

For example, FIG. 6 illustrates a side-view of a scenario 600 in which an HMD wearer moves their head with respect to their body. In particular, the person moves their head from a first position 602a to a second position 602b. In the first position 602a, the person is facing forward, such that there their head is substantially aligned with their body 604. In other words, there is no rotation or pitch of the head with respect to their body, so the axes of the body are generally parallel to the axes of the head. However, when the person moves their head to the second position 603b, the position of their head is such that there is a pitch $\Phi_{H-B}$ of their head 602 relative to their body 604. Further, roll of the head may be determined by combining the analysis of differences in accelerometer data with analysis of differences in magnetometer data (and possibly differences in gyroscope data as well) between the HMD and the tracking device.

More specifically, to determine the pitch $\Phi_{H-B}$ of the head with respect to the ground, a low-pass filter may be applied to the accelerometer signal from the tracking device and/or the HMD to substantially cancel out other motions and determine a direction of gravity; i.e., to determine the downward direction and thus provide the alignment of the UP-DOWN axis shown in FIG. 6. The HMD could then determine the pitch $\Phi_{H-B}$ of the head based on measured gravity vector (e.g., in the downward direction on the UP-DOWN axis in the coordinate frame of the HMD. (Note that the coordinate frame of the HMD is shown by $Y_{HMD}$ and $Z_{HMD}$ in FIG. 6.) The angle of the gravity vector as compared to the $Y_{HMD}$ axis may then be used to determine the pitch $\Phi_{H\text{-}B}$ of the head.

Further, to determine the roll of the head with respect to the ground, an HMD may apply a similar technique as that used to determine the pitch, except that the HMD (or associated computing device) may determine the downward direction and the direction to the right or left of the body. In particular, the HMD may determine a coordinate frame defined by the direction of gravity (e.g., the UP-DOWN axis shown in FIG. 6), and the right-left axis of the body (e.g., the $X_B$ axis shown in FIG. 4B). The angle of the gravity vector as compared to the $X_{HMD}$ axis (as shown in FIG. 4A) may then be used to determine the roll of the head.

By performing the above the HMD may determine the pitch and/or roll of the HMD, and thus the angle of the head, with respect to the ground (i.e., with respect to gravity). The same process may be carried out by a tracking device such as a phone to determine the pitch and/or roll of the tracking device with respect to the ground (i.e., with respect to gravity). Then, the pitch and/or roll of the HMD with respect to the body may be determined by using the axis defined by gravity (e.g., the UP-DOWN axis) in a similar manner as the forward-backward axis is used to determine the yaw.

F. Re-Calibration

As noted above, it may be assumed that the base orientation $\theta_{TD\text{-}B}$ of the tracking device relative to the forward-backward body axis stays substantially the same over certain periods of time. However, it is possible that $\theta_{TD\text{-}B}$ can change over time. For instance, the orientation of a mobile phone with respect to the body may change when, e.g., the mobile phone shifts within the wearer's pocket or the wearer moves the mobile phone from a console in their car to their purse. Accordingly, an example method may further involve a computing device re-calibrating to compensate for changes in a tracking device's position relative to the body.

For example, in some embodiments, a computing device may periodically repeat blocks 302 to 306 of method 300 in order to re-determine the base orientation $\theta_{TD\text{-}B}$ of the tracking device relative to the forward-backward body axis. By doing so, the computing device may update the offset that is applied to the orientation $\theta_{HMD\text{-}TD}$ of the HMD relative to the tracking device.

In some embodiments, a computing device may additionally or alternatively monitor or periodically check whether the orientation of the tracking relative to the body has changed. The computing device may then re-calibrate when it determines that the orientation of tracking device relative to the body has changed (or is likely to have changed). For example, a computing device may receive or detect an indication that the tracking device has moved in relation to the body (e.g., in a message from the tracking device). In response to the indication that the tracking device has moved in relation to the body, the computing device may monitor the HMD's sensor data and/or the tracking device's sensor data until it detects sensor data that indicates a calibration event (e.g., the wearer walking forward), and then re-determine the base orientation $\theta_{TD\text{-}B}$ of the tracking device relative to the forward-backward body axis.

IV. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
    detecting, by a computing device, sensor data that is indicative of an association between movement of a tracking device and body movement;
    in response to detecting the sensor data that is indicative of the association between movement of the tracking device and body movement:
        determining a direction of the body movement that is associated with the movement of the tracking device;
        determining, based on the direction of the body movement, a forward-backward body axis of a body; and
        determining a base orientation of a tracking device relative to the forward-backward body axis;
    determining a first orientation of a head-mountable device (HMD) relative to the tracking device, wherein the HMD and the tracking device are separate devices; and
    determining a first head orientation relative to the body based on both: (a) the first orientation of the HMD relative to the tracking device and (b) the base orientation of the tracking device relative to the forward-backward body axis, wherein determining the first head orientation relative to the body comprises offsetting the first orientation of the HMD relative to the tracking device by the base orientation of the tracking device relative to the forward-backward body axis.

2. The method of claim 1, wherein the computing device is the HMD.

3. The method of claim 1, wherein the computing device is the tracking device.

4. The method of claim 1, wherein the tracking device is a mobile phone.

5. The method of claim 1, wherein detecting the sensor data that is indicative of the association between movement of the tracking device and body movement comprises:
    receiving sensor data from at least one of the HMD and the tracking device, wherein the sensor data is indicative of movement; and
    determining that the sensor data is characteristic of movement along the forward-backward body axis.

6. The method of claim 5, wherein determining that the sensor data is characteristic of movement along the forward-backward body axis comprises determining that the sensor data is characteristic of walking.

7. The method of claim 5, wherein the sensor data comprises at least one of: (a) gyroscope data associated with the HMD, (b) accelerometer data associated with the HMD, (c) gyroscope data associated with the tracking device, and (d) accelerometer data associated with the tracking device.

8. The method of claim 1, wherein determining a forward-backward body axis of a body comprises determining a direction of forward body movement.

9. The method of claim 1, wherein determining a base orientation of the tracking device relative to the forward-backward body axis comprises determining an angle between a forward-facing direction of the tracking device and the directional component along the forward-backward body axis.

10. The method of claim 1, wherein the first orientation of the HMD relative to the tracking device is determined based on both: (a) magnetometer data associated with the HMD and (b) magnetometer data associated with the tracking device.

11. The method of claim 10, wherein determining the first orientation of the HMD relative to the tracking device comprises:

determining a first orientation of the HMD relative to magnetic north based on the magnetometer data associated with the HMD;

determining a first orientation of the tracking device relative to magnetic north based on the magnetometer data associated with the tracking device; and determining the first orientation of the HMD relative to the tracking device based on a difference between (a) the first orientation of the HMD relative to magnetic north and (b) the first orientation of the tracking device relative to magnetic north.

12. The method of claim 1, further comprising:

subsequently detecting a calibration event, wherein detecting the calibration event comprises receiving an indication that the tracking device has moved in relation to the body; and in response to detecting the calibration event:

analyzing the sensor data to detect subsequent sensor data that is indicative of an association between second movement of a tracking device and second body movement; and in response to detecting the subsequent sensor data that is indicative of the association, re-determining, based on a direction of the second body movement, the base orientation of the tracking device relative to the forward-backward body axis.

13. The method of claim 1, further comprising causing a display of the HMD to display graphics based on the first head orientation relative to the body.

14. The method of claim 1, further comprising initiating a computing action based on the first head orientation relative to the body.

15. The method of claim 1, wherein determining a first head orientation relative to the body comprises determining a rotation of the head relative to the forward-backward body axis.

16. The method of claim 1, wherein determining a first head orientation relative to the body comprises determining two or more of: (a) a rotation of the head relative to the forward-backward body axis, (b) a pitch of the head relative to an upward-downward body axis and (c) a yaw of the head relative to the forward-backward body axis and the upward-downward body axis.

17. A non-transitory computer readable medium having stored therein instructions that are executable to cause a computing device to perform functions comprising:

detecting sensor data that is indicative of an association between movement of a tracking device and body movement;

in response to detecting the sensor data that is indicative of the positional association between movement of the tracking device and body movement:

determining a direction of the body movement that is associated with the movement of the tracking device;

determining a forward-backward body axis of a body based on the direction of the body movement; and determining a base orientation of a tracking device relative to the forward-backward body axis;

determining a first orientation of a head-mountable device (HMD) relative to the tracking device, wherein the HMD and the tracking device are separate devices; and determining a first head orientation relative to the body based on both: (a) the first orientation of the HMD relative to the tracking device and (b) the base orientation of the tracking device relative to the forward-backward body axis, wherein determining the first head orientation relative to the body comprises offsetting the first orientation of the HMD relative to the tracking device by the base orientation of the tracking device relative to the forward-backward body axis.

18. The non-transitory computer readable medium of claim 17, wherein the first orientation of the HMD relative to the tracking device is determined based on both: (a) magnetometer data associated with the HMD and (b) magnetometer data associated with the tracking device.

19. The non-transitory computer readable medium of claim 18, wherein determining the first orientation of the HMD relative to the tracking device comprises:

determining a first orientation of the HMD relative to magnetic north based on the magnetometer data associated with the HMD;

determining a first orientation of the tracking device relative to magnetic north based on the magnetometer data associated with the tracking device; and determining the first orientation of the HMD relative to the tracking device based on a difference between (a) the first orientation of the HMD relative to magnetic north and (b) the first orientation of the tracking device relative to magnetic north.

20. The non-transitory computer readable medium of claim 19, wherein determining a first head orientation relative to the body comprises determining two or more of: (a) a rotation of the head relative to the forward-backward body axis, (b) a pitch of the head relative to an upward-downward body axis and (c) a yaw of the head relative to the forward-backward body axis and the upward-downward body axis.

21. A computing system comprising:

a non-transitory computer readable medium;

program instructions stored on the non-transitory computer readable medium and executable by at least one processor to:

detect first sensor data that is indicative of both (a) a device arrangement indicative of an association between movement of a tracking device and body movement and (b) an alignment of a forward-backward axis of the body with a direction of movement associated with a head-mountable device (HMD);

in response to detecting the first sensor data:

determine the direction of the body movement that is associated with the movement of the tracking device;

determine, based on the direction of the body movement, a forward-backward body axis of a body; and determine a base orientation of a tracking device relative to the forward-backward body axis;

subsequently determine a first orientation of a head-mountable device (HMD) relative to the tracking device, wherein the HMD and the tracking device are separate devices; and determine a first head orientation relative to the body based on both: (a) the first orientation of the HMD relative to the tracking device and (b) the base orientation of the tracking device relative to the forward-backward body axis, wherein the determination of the first head orientation relative to the body comprises offsetting the first orientation of the HMD relative to the tracking device by the base orientation of the tracking device relative to the forward-backward body axis.

22. The computing system of claim 21, wherein the computing system is implemented in or takes the form of the HMD.

23. The computing system of claim 21, wherein the first orientation of the HMD relative to the tracking device is determined based on both: (a) magnetometer data associated with the HMD and (b) magnetometer data associated with the tracking device.

24. The computing system of claim 21, wherein the determined first head orientation relative to the body comprises two or more of: (a) a rotation of the head relative to the forward-backward body axis, (b) a pitch of the head relative to an upward-downward body axis and (c) a yaw of the head relative to the forward-backward body axis and the upward-downward body axis.

25. The method of claim 1, wherein detecting sensor data that is indicative of the association between movement of the tracking device and body movement comprises determining that movement of at least one of the tracking device and the HMD is characteristic of walking.

26. The method of claim 1, further comprising:
analyzing the sensor data for any occurrence of a calibration event, wherein the detecting of the sensor data that is indicative of the association between the movement of a tracking device and the body movement is a calibration event.

* * * * *